(12) United States Patent
Neeper

(10) Patent No.: US 8,910,985 B2
(45) Date of Patent: *Dec. 16, 2014

(54) GRIPPER APPARATUS AND METHOD FOR CONTAINERS OF DIFFERENT SIZES

(71) Applicant: Brooks Automation, Inc., Chelmsford, MA (US)

(72) Inventor: Robert K. Neeper, Ramona, CA (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,926

(22) Filed: May 13, 2013

(65) Prior Publication Data

US 2013/0336755 A1    Dec. 19, 2013

Related U.S. Application Data

(63) Continuation of application No. 12/908,780, filed on Oct. 20, 2010, now Pat. No. 8,439,414.

(60) Provisional application No. 61/253,487, filed on Oct. 20, 2009.

(51) Int. Cl.
| | | |
|---|---|---|
| *B65G 7/12* | (2006.01) | |
| *B66C 1/00* | (2006.01) | |
| *B25J 15/00* | (2006.01) | |
| *B25J 9/10* | (2006.01) | |
| *B66C 1/44* | (2006.01) | |
| *B25J 15/10* | (2006.01) | |

(52) U.S. Cl.
CPC .............. *B25J 15/0028* (2013.01); *B25J 9/102* (2013.01); *B66C 1/44* (2013.01); *B25J 15/10* (2013.01); *Y10S 294/902* (2013.01); *Y10S 294/907* (2013.01); *Y10S 901/38* (2013.01)
USPC ........... 294/119.1; 294/902; 294/907; 901/38

(58) Field of Classification Search
CPC ............ Y10S 294/902; Y10S 294/907; H01L 21/68707; B65G 47/90; B25J 15/0253; B25J 15/0009; B25J 9/102; B25J 15/10; A61F 2002/701; G01N 35/0099; G01N 2035/0443; E21B 19/22; B65H 2220/01; B65H 2220/02
USPC ......................... 294/119.1, 902, 907; 901/38
See application file for complete search history.

(56) References Cited

U.S. PATENT DOCUMENTS

| | | |
|---|---|---|
| 3,866,966 A | 2/1975 | Skinner, II |
| 3,901,547 A | 8/1975 | Skinner, II |
| 4,653,793 A | 3/1987 | Guinot et al. |
| 5,080,682 A | 1/1992 | Schectman |
| 5,215,507 A | 6/1993 | Bonig |
| 5,280,981 A | 1/1994 | Schulz |
| 2010/0101346 A1 | 4/2010 | Johnson et al. |

FOREIGN PATENT DOCUMENTS

EP    1595658    11/2005

*Primary Examiner* — Stephen Vu
(74) *Attorney, Agent, or Firm* — Perman & Green, LLP; Colin C. Durham

(57) ABSTRACT

A gripper apparatus for removing and replacing objects such as containers or vials in an array of containers has a gripper head which extends downward from a support arm, a planetary gear assembly mounted in the gripper head including at least three planet gears, and at least one gripping grip extending downward from each planet gear and projecting beyond a lower end of the gripper head. A drive motor drives the planetary gear assembly to rotate the planet gears in opposite directions, moving the grips inward and outward along predetermined paths to grip and carry an object and release the object when in a desired location.

15 Claims, 16 Drawing Sheets

GRIPPER APPARATUS AND METHOD FOR CONTAINERS OF DIFFERENT SIZES

CROSS-REFERENCE TO RELATED APPLICATION(S)

This application is a continuation of U.S. patent application Ser. No. 12/908,780, filed Oct. 20, 2010 (now U.S. Pat. No. 8,439,414) which is a non-provisional of U.S. Provisional Application No. 61/253,487, filed Oct. 20, 2009 the disclosures of which are incorporated by reference herein in their entireties.

BACKGROUND

The present invention relates generally to robotic gripping devices. More particularly, the invention concerns a method and apparatus to grasp containers of varied sizes using a plurality of movable fingers Many industries rely upon automated handling of bottles, vials and tubes of different sizes. In many applications, the ability to handle different size containers is provided by a rotating turret assembly with a number of different size openings arranged on a circular assembly. The turret is rotated to select the opening with a size that matches a selected container size. In other applications, rather than requiring the selection from multiple handlers to accommodate each different size container, attempts have been made to provide adjustable grippers which operate by moving two to more fingers inward and outward relative to a center point at which the container is located. Typically, the fingers are pneumatically actuated. The fingers may either move on fulcrums, like "pincers", so that the angles of the gripping surfaces change, or they can slide along a single plane so that the fingers remain parallel with the distance between the fingers being adjusted to fit the container diameter. In one example, the gripper mechanism described in U.S. Pat. No. 6,592,324 of Downs et al uses a combination of sliding and rotation of two arms to pin microplates. While such systems may work well with containers of a consistent size, the force applied to the container can vary depending on the size of the container. These failings are particularly pronounced in applications involving the storage of compounds, biological specimens or other samples. Such storage systems hold many thousands of samples which may be in different size glass or plastic vials or tubes and may have different closure means, such as stoppers inserted into the opening and caps or adhesive films covering the edges of the openings. The gripper robotics are often contained within an environmentally-controlled enclosure, making frequent changing of the gripping mechanism to fit a particular container impractical. Since the containers usually hold very small volume samples, these vials and tubes can be small and relatively fragile. One of the problems that can occur with variable force control on current the commercially-available grippers is that sometimes the caps or tubes are broken or are not gripped sufficiently well. These grippers are also incapable of self-adjusting for different cap sizes. Another problem is that pneumatic grippers do not produce sufficient feedback to let the system know if a tube of the expected dimensions was, in fact, picked up.

In view of the shortcomings of existing grippers, the need remains for a container gripper that has the ability to adjust to a range of container sizes and surfaces, and which provides feedback to allow control of the force applied to the container. The present invention is directed to such an invention.

SUMMARY OF THE INVENTION

In an exemplary embodiment, a gripper apparatus has a gripper head extending downward from a gripper support arm. The gripper head comprises a stationary ring gear and a plurality of planet gears which cooperate with the inner teeth of the ring gear. Typically, three or four planet gears are provided. Each planet gear has a pin extending downward from near an outer edge of the planet gear. Each planet gear is rotatably attached to the lower surface of a rotatable gear plate which has a crescent gear disposed on its upper surface in one embodiment.

In one embodiment, the pins may be attached to small fingers extending from the edge of each planet gear. The gear plate and crescent gear have a common pivot point. The crescent gear cooperates with a drive gear above the gear plate to rotate the plate so that, as the plate rotates, the teeth of the planet gears cooperate with the teeth of the ring gear. In another embodiment, the crescent gear is replaced by a center gear, and each planet gear has teeth meshing with teeth of the center gear.

The rotation of the planet gears causes the pins to move along a radial path relative to the center pivot of the gear plate, thus varying the distance between the pins on adjacent gears and allowing them to adjust to accommodate any container size that is up to the inner diameter of the ring gear, where the pins are straight. If the pins are bent outward, the gripper may be used with containers that have diameters larger than the inner diameter of the ring gear.

A stationary bottom plate attaches to the bottom of the gear assembly to enclose the planet gears. Radial slots formed in the face of the bottom plate correspond to the radial path of each pin.

The drive gear is connected to a small servo motor mounted above the gripper support arm. The motor gives feedback to a gripper controller, allowing the force applied to the pins to be carefully controlled. Control of the force applied to the pins is a simple matter of increasing or decreasing the range of rotation of the crescent gear. The pins may be covered or coated with a resilient, high friction surface, such as a silicone or elastomer sleeve, to prevent slippage between the pins and the container. In a preferred embodiment, software within the gripper controller will be able to "feel" what is being gripped based on the amount of give as the gripper pins are tightened, allowing the gripper to distinguish between, for example, a metal or hard plastic cap and a rubber stopper. The small diameter of the pins allows the gripper to be used to select vials from high density arrays. Four pin grippers can be configured to define the corners of a square, for use with standard arrays or rectangular, for use with high density arrays. The distal ends of the pins are tapered top facilitate insertion of the pins into a closely packed array of containers. In one embodiment, the pins may be bent outward to permit gripping of containers that have larger diameters than the ring gear. Conversely, if the pins are bent inward, they can come close to touching, thus allowing the smallest diameter object to be gripped.

The gripper head of the present invention is particularly useful for handling of the small vials and tubes that are used in biological and chemical compound storage systems. However, upward scaling of the gripper head would allow handling of larger containers, including beverage bottles, food jars and other commonly-used containers.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE EXEMPLARY EMBODIMENT(s)

Certain embodiments as disclosed herein provide for a robotic gripping method and apparatus for grasping containers of various sizes using a plurality of movable fingers. In one embodiment, the pins depend from respective planet gears of a planetary gear assembly which is driven to rotate the planet gears so that the pins move on radial paths relative to a central pivot axis, and the spacing between the pins can be varied to pin different size containers.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1A:
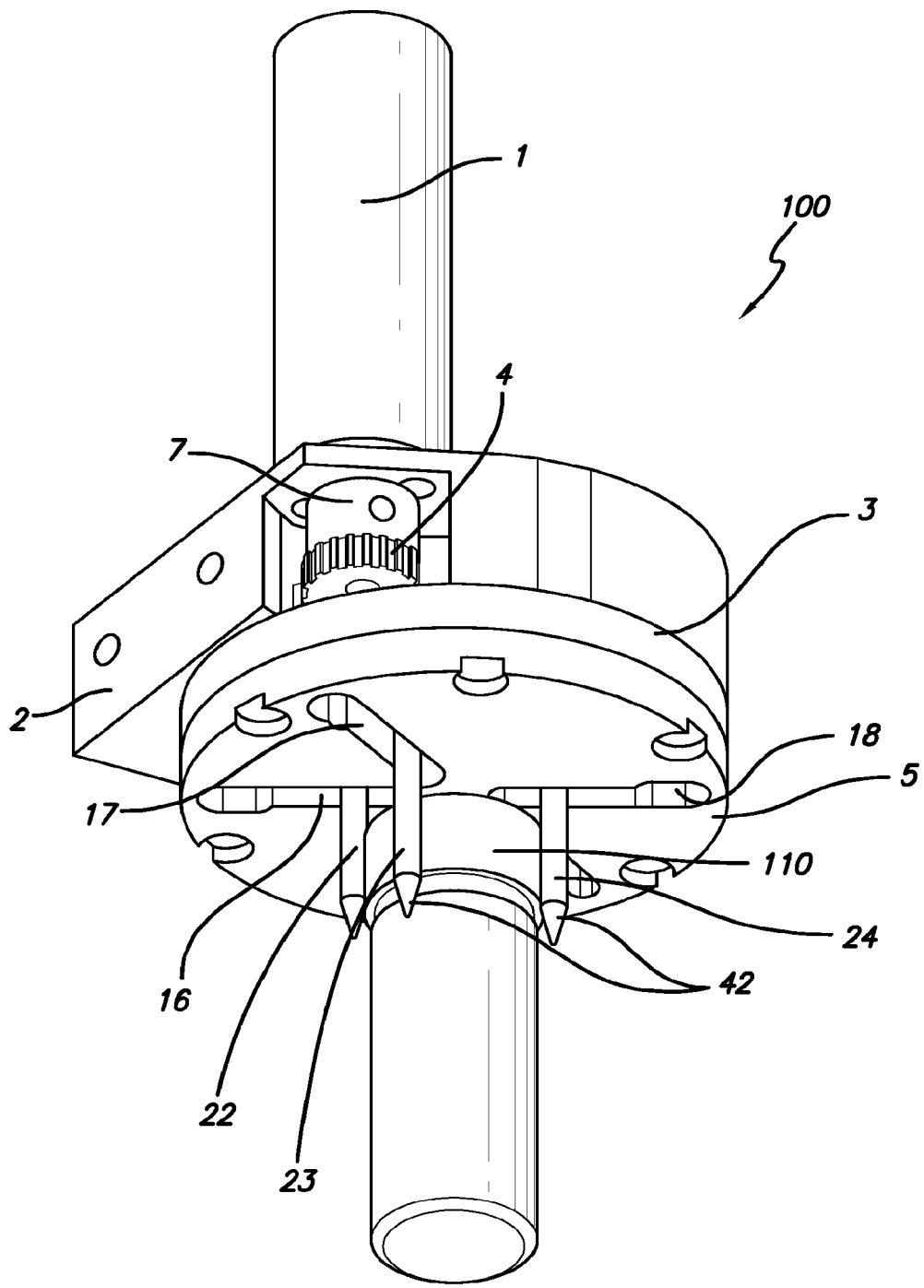
FIG. 1A is a diagrammatic perspective view of one embodiment of a gripper apparatus with the grippers or gripping pins holding a small, capped vial.
Figure 1B:
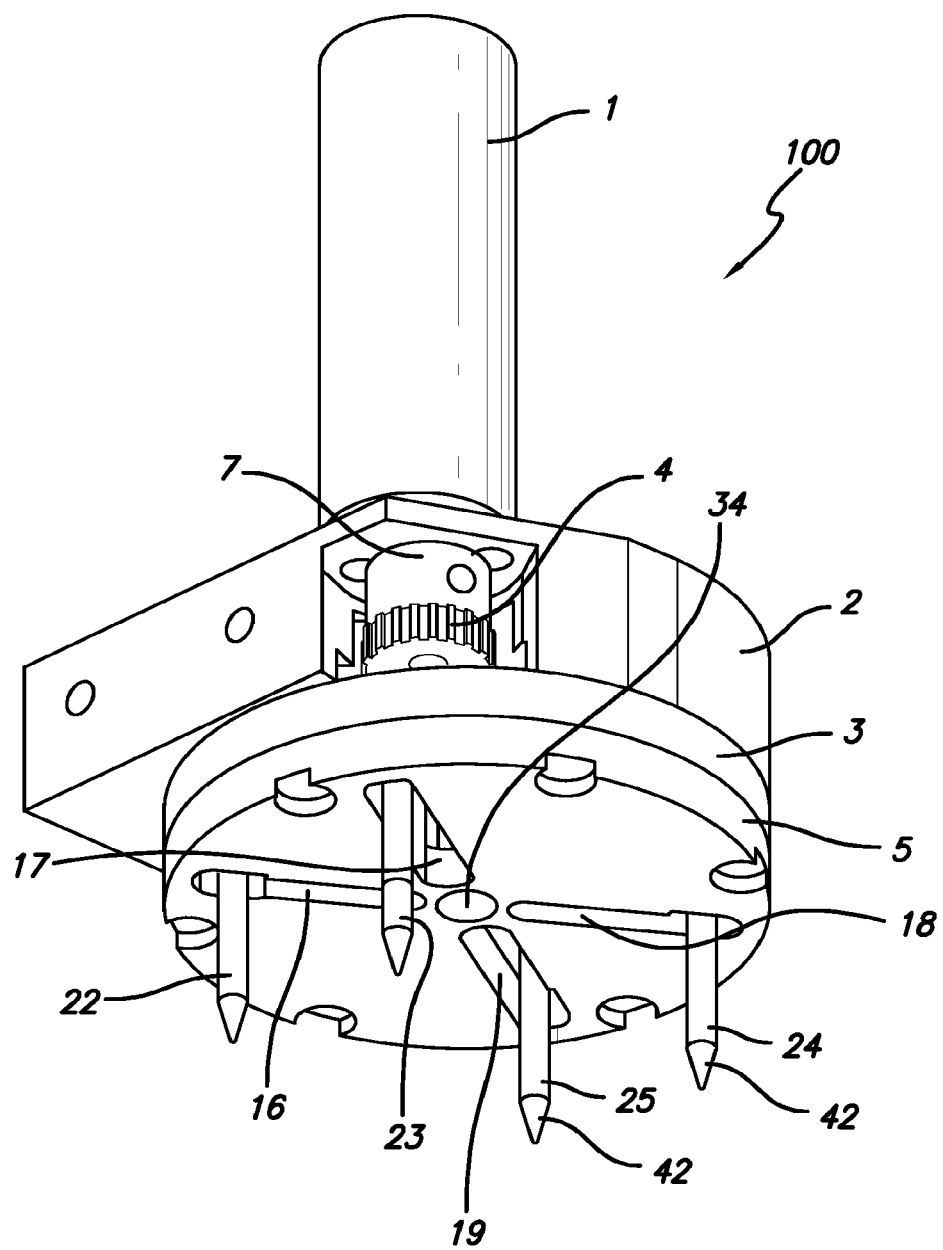
FIG. 1B shows the gripper apparatus with the grippers fully opened, without the vial.
Figure 2A:
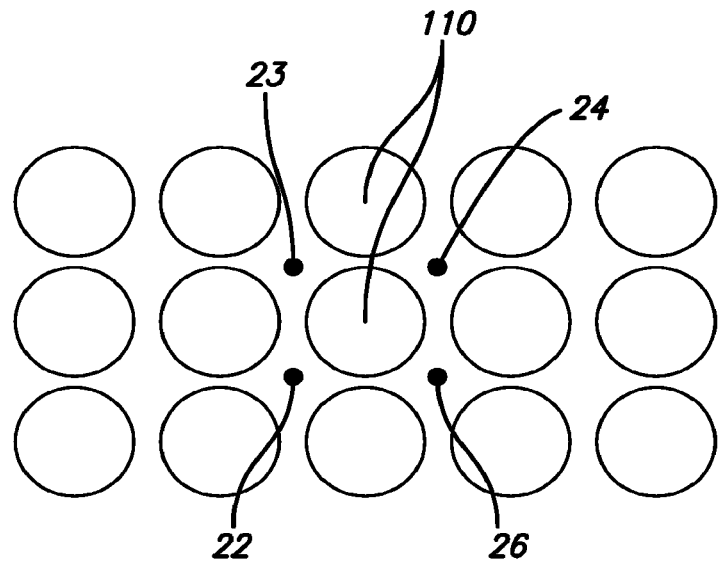
FIGS. 2A and 2B show arrays of vials or containers in a normal (2A) and high density (2B) arrangement, illustrating the grippers engaged around one of the vials.
Figure 2B:
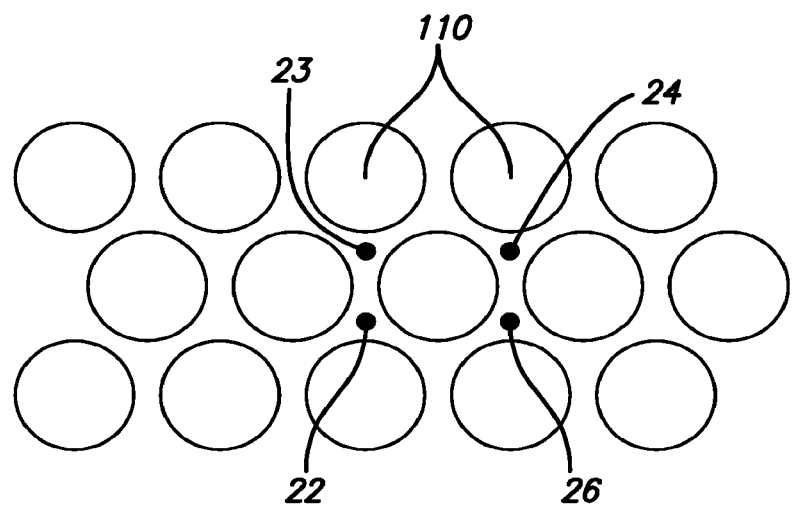

FIGS. 1A, 1B and 3A to 4D illustrate a gripper apparatus 100 according to a first embodiment, while FIGS. 2A and 2B illustrate positioning of the gripping pins 22, 23, 24 and 26 of apparatus 100 to pin a container in an array. FIG. 1A illustrates the pins in gripping and lifting container 110, while FIG. 1B illustrates the apparatus not engaged with a container and with the pins 22, 23, 24, and 26 in positions spaced outwardly from those of FIG. 1A and defining a large size of opening to engage the rim of a larger container.

As shown in FIGS. 1A and 1B, the gripper apparatus comprises a gripper head extending from support 1 and comprising a support base 2, a stationary ring gear 3 and a stationary bottom plate 5 attached to the bottom of the ring gear to enclose a planetary gear assembly 35 which is illustrated in FIGS. 3A to 4D and which has a central gear axis 30. The planetary gear assembly 35 basically comprises four planet gears 6, 8, 10, 14 which revolve about parallel planet gear axes, a carrier or gear device 12, 13 on which each planet gear is rotatably mounted, and an outer ring gear 3 with inwardly directed teeth 50 with which the teeth of the planet gears mesh, as best illustrated in FIGS. 3B, 3D, 4B and 4D. Gripping pins 22, 23, 24, 26 depend from respective planet gears 6, 8, 10, 12 inside ring gear 3 and through respective radial slots 16, 17, and 19 in bottom plate 5 for engagement with the rim of a container or vial such as container 110. The planet gears are driven by a motor driven drive gear 4, as described in more detail below with reference to FIGS. 3A to 4D.

Figure 3A:
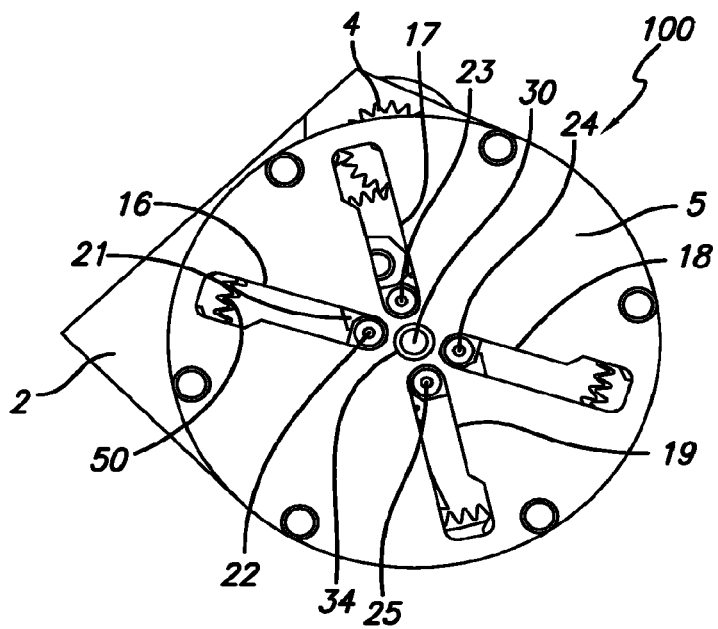
FIG. 3A is a bottom view of the apparatus with the gripping pins at their innermost positions to hold a small diameter vial.
Figure 3B:
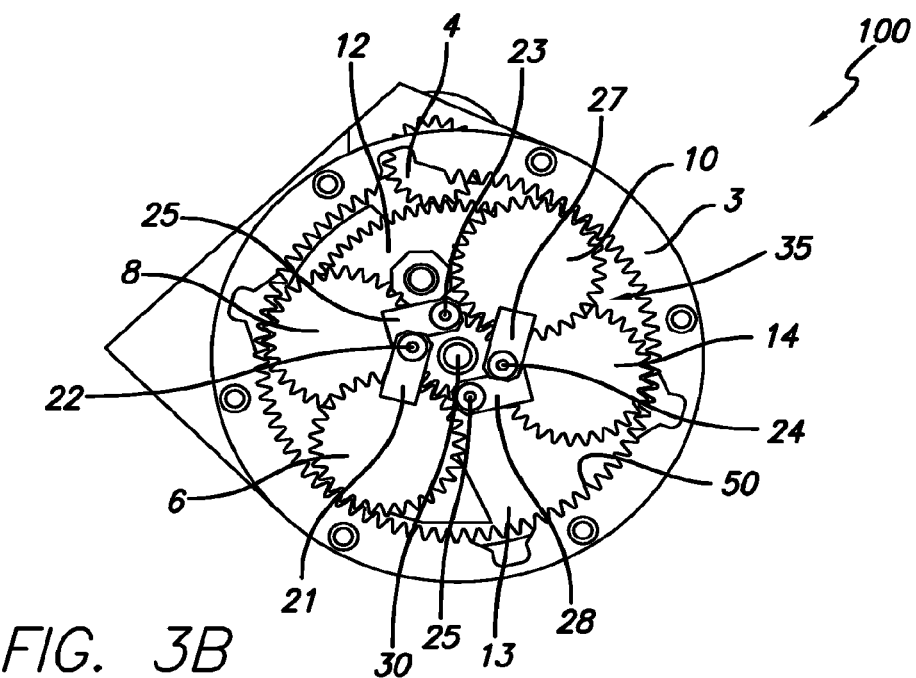
FIG. 3B is a bottom view similar to FIG. 3A, with the bottom plate removed and the gripping pins in the same position as shown in FIG. 3A.

While four planet gears are shown in FIGS. 3A to 4D, there may be as few as three or more than four. Gripping pins 22, 23, 24, 26 extend downward from near the outer edges of the respective planet gears. In the illustrated embodiment, the gripping pins 22, 23, 24, 26 are each secured to a respective finger 21, 25, 27 and 28 which extends from the edge of the respective planet gear, to align the finger with the respective slot 16, 17, 18 or 19 as seen in FIGS. 3A and 3C. Each planet gear is rotatably attached to the lower surface of a carrier or mounting plate 13 which has a crescent gear 12 disposed on its upper surface (gear plate 13 is cut away in FIG. 3B to reveal crescent gear 12). Mounting plate 13 and crescent gear 12 are rotatably mounted for rotation about central axis 30 of the gear assembly.

The crescent gear 12 cooperates with drive gear 4 above plate 13 to rotate the plate so that, as mounting plate 13 rotates, the planet gears rotate with the gear plate about central axis 30, and at the same time, the teeth of the planet gears 6, 8, 10 and 14 cooperate with the teeth of the ring gear to rotate each planet gear about its own pivot axis. The rotation of the planet gears causes the pins 22, 23, 24 and 25 to move along radial paths relative to the center pivot 30 of the gear plate, thus varying the distance between the pins on adjacent gears and allowing them to adjust to accommodate any container size that is up to the inner diameter of the ring gear.

Figure 3C:
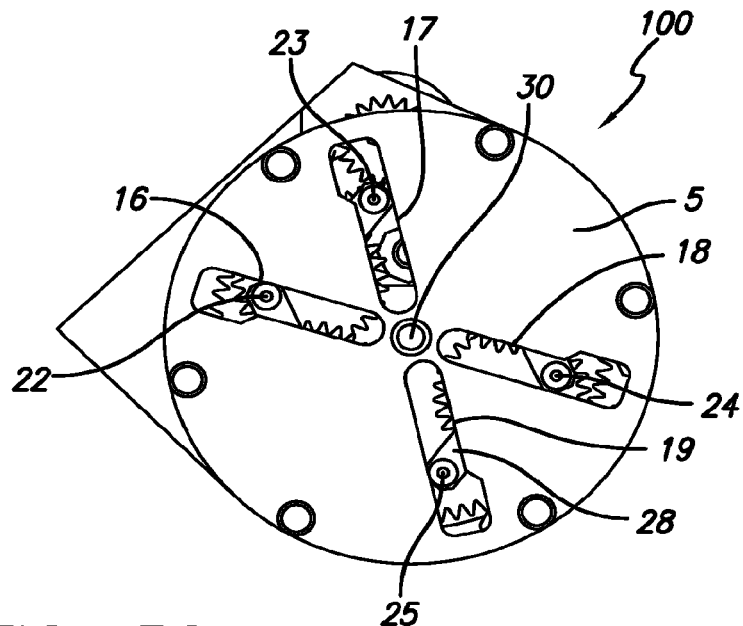
FIG. 3C is a bottom view similar to FIG. 3A, but with the pins moved outwardly from the positions in FIG. 3A to define a larger size opening.
Figure 3D:
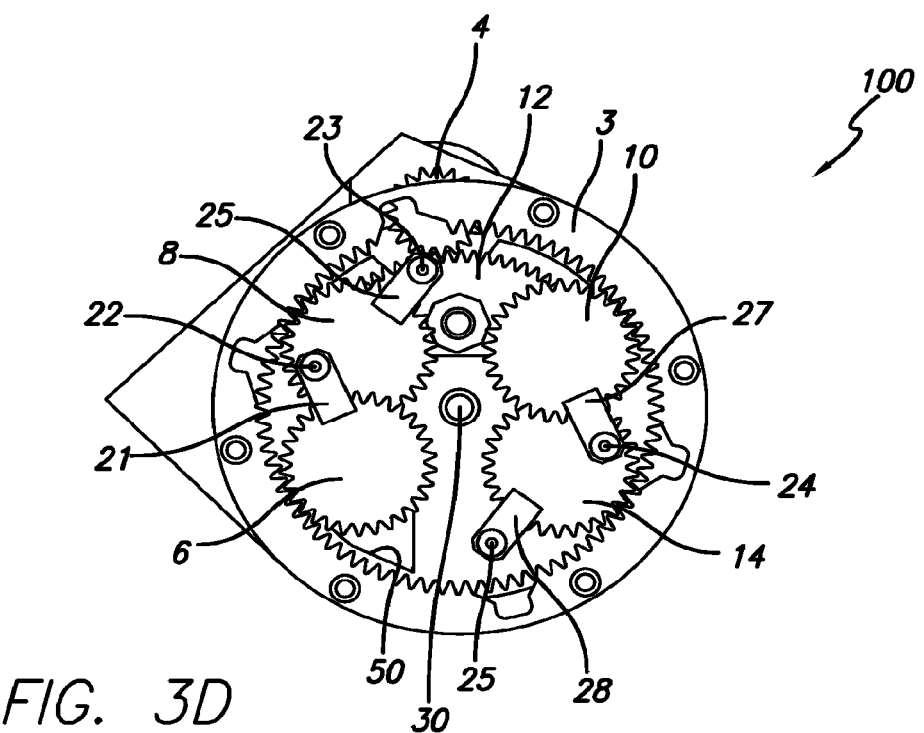
FIG. 3D is a bottom plan view similar to FIG. 3C but with the bottom plate removed.
Figure 4A:
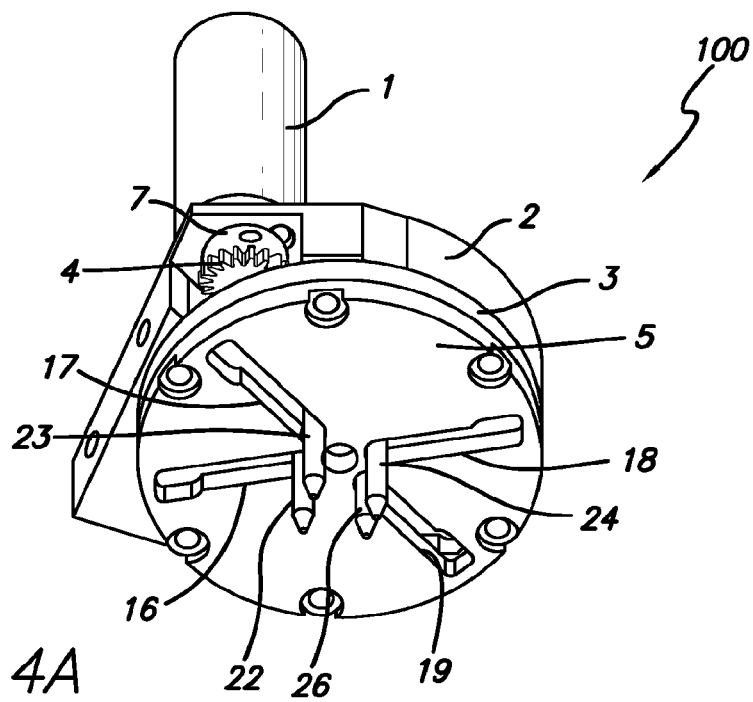
FIG. 4A is a bottom perspective view of the apparatus of FIGS. 1A, 1B, and 3A to 3D, with the pins in the same position as FIG. 3A and the bottom plate attached.
Figure 4B:
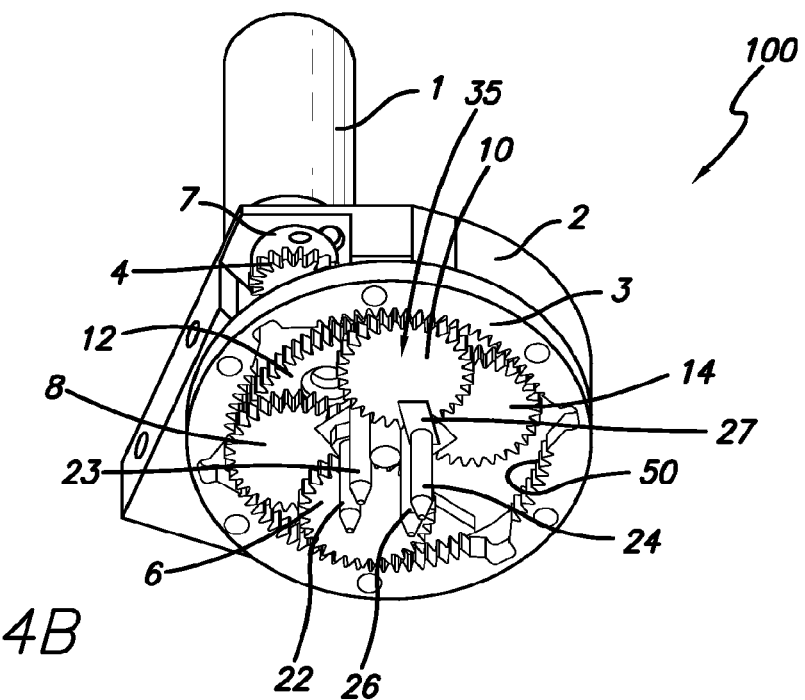
FIG. 4B is a bottom perspective view similar to FIG. 4A but with the bottom plate removed.
Figure 4C:
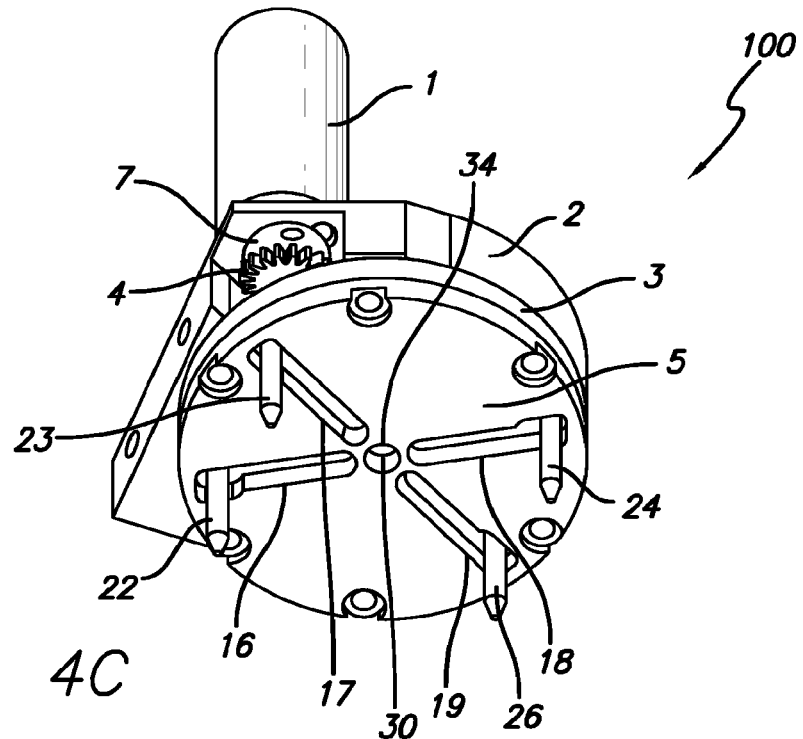
FIG. 4C is a perspective view similar to FIG. 4A but with the pins in the outermost positions to define the largest diameter opening.
Figure 4D:
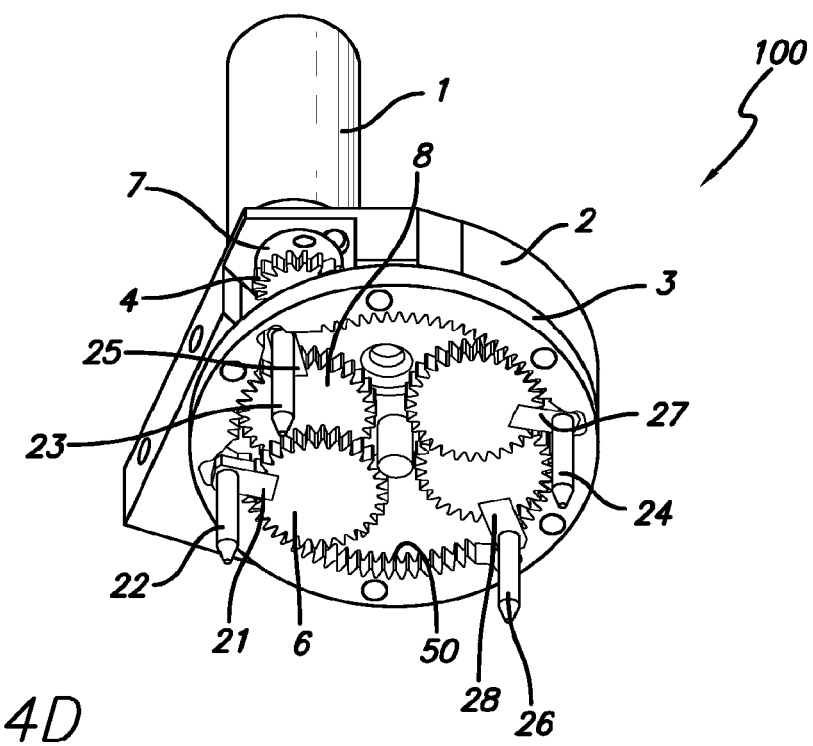
FIG. 4D is a view similar to FIG. 4C but with the bottom plate removed.
Figure 5:
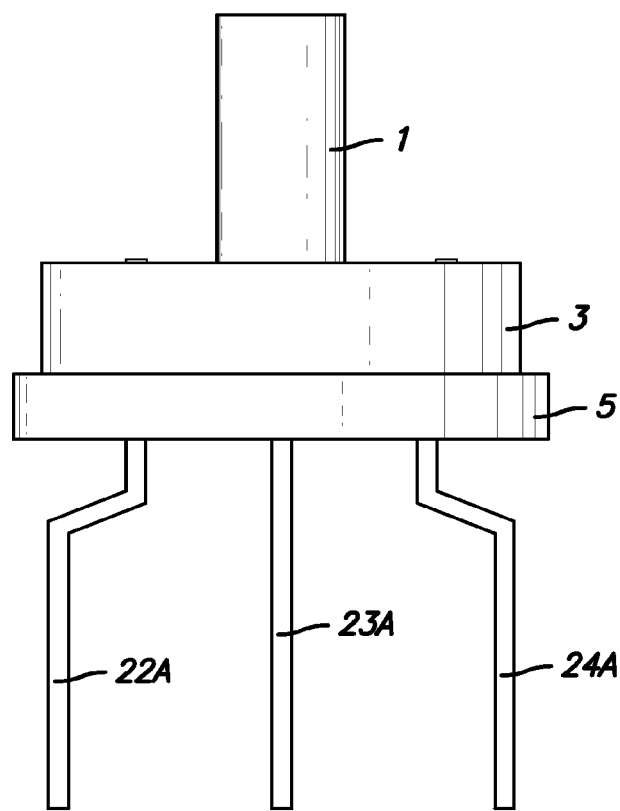
FIG. 5 is a side view of a gripper apparatus similar to that of FIGS. 1 to 4D but with outwardly bent pins shown in a fully open position.

FIGS. 3A, 3B, 4A and 4B illustrate the pins 22, 23, 24 and at their innermost position at the inner ends of the respective slots 16, 17, 18 and 19, defining a minimum pin spacing for gripping the smallest diameter vial or container. In FIGS. 3C and 3D, the planet gears have rotated away from the position of FIGS. 3A and 3B so as to move the pins 22, 23, 24 and outwardly along the respective slots, defining a larger opening for gripping a larger diameter vial. In FIGS. 4C and 4D, the pins 22, 23, 24 and 25 are moved to the outermost position in the respective slots, at the largest spacing for gripping the largest diameter vial. As illustrated in FIG. 4D, for straight pins this corresponds to the inner diameter of ring gear 3. In an alternative embodiment illustrated in FIG. 5, the straight pins of FIGS. 1 to 4 are replaced by bent pins 22A, 23A, 24A (the bent pin corresponding to pin 25 is not visible in FIG. 5). If the pins are bent outward, as shown in FIG. 5, the gripper may be used with containers that have diameters larger than the inner diameter of the ring gear.

Figure 15:
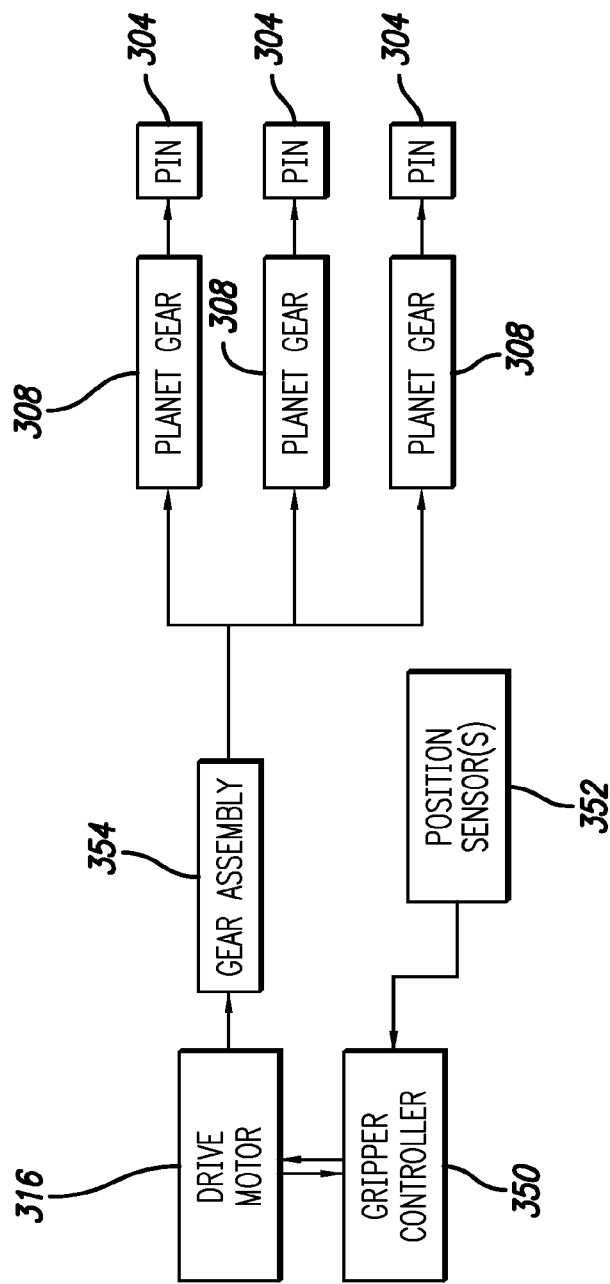
FIG. 15 is a block diagram illustrating one embodiment of a control system for the gripper apparatus of any of the preceding embodiments.

An opening 34 at the center of bottom plate 5 (see FIG. 1B) provides a sight line for an optional optical sensor for detecting the presence of a vial. The drive gear 4 is connected to a small reversible servo motor 7 mounted above the gripper support arm 1. The motor gives feedback to a gripper controller, allowing the force applied to the pins to be carefully controlled. One embodiment of a control system for the gripper apparatus is illustrated in FIG. 15 and described in more detail below. The pins are first positioned at a spacing outside the diameter of the container in alignment with the spaces between the selected container and adjacent container in the array, as illustrated in FIG. 2A for a standard container array. Once the gripper is lowered so that the pins engage in the gaps between containers, the pins are driven inwards to engage the container as illustrated in FIG. 1A, and the gripper is then lifted to pick up the container and remove it from the array. The operation is reversed to return a container to an array or place a new container in an array of similar containers. FIG. 2B illustrates a high density array with the gripping pins surrounding one container in the array.

Control of the force applied to the pins is a simple matter of increasing or decreasing the range of rotation of the crescent gear. The pins may be covered or coated with a resilient, high friction surface, such as a silicone or elastomer sleeve, to prevent slippage between the pins and the container. In one embodiment, software within the gripper controller will be able to "feel" what is being gripped based on the amount of give as the gripper pins are tightened, allowing the gripper to distinguish between, for example, a metal or hard plastic cap and a rubber stopper. The small diameter of the pins allows the gripper to be used to select vials from high density arrays. Four pin grippers can be configured to define the corners of a square, as in FIG. 2A, for use with standard arrays or rectangular, as in FIG. 2B, for use with high density arrays. The distal ends 42 of the pins are tapered to facilitate insertion of the pins into a closely packed array of containers. In one embodiment, the pins may be bent outward to permit gripping of containers that have larger diameters than the ring gear, as illustrated in FIG. 5. Conversely, if the pins are bent inward, they can come close to touching, thus allowing the smallest diameter object to be gripped.

The gripper head of the present invention is particularly useful for handling of the small vials and tubes that are used in biological and chemical compound storage systems. However, upward scaling of the gripper head would allow handling of larger containers, including beverage bottles, food jars and other commonly-used containers.

Although the central axis and planet gear axes are all parallel in the embodiment of FIGS. 1A to 4D, they may be placed at an angle in alternative embodiments to vary the gripping pin movement.

Figure 6:
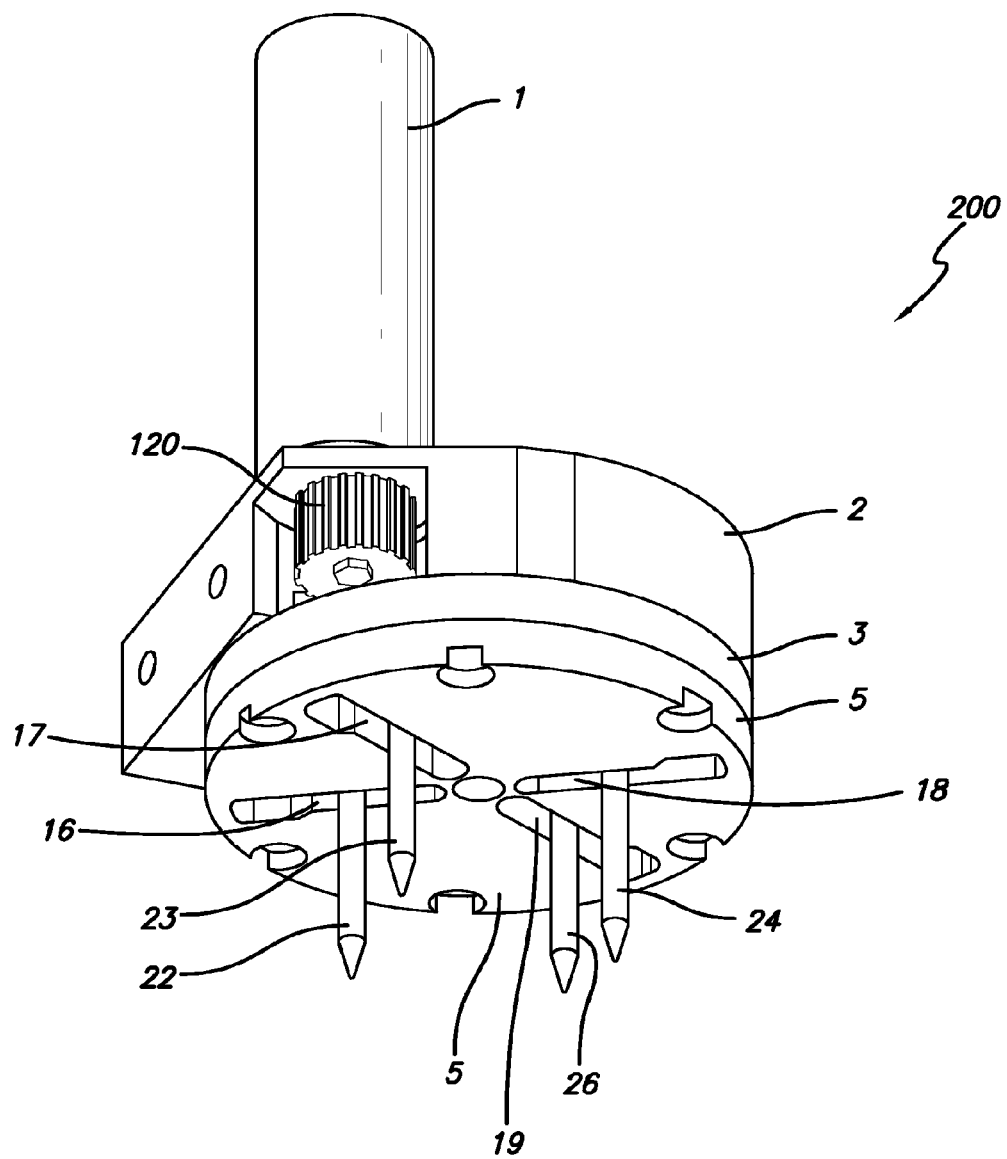
FIG. 6 is a perspective view of another embodiment of a four pin gripper apparatus.
Figure 7:
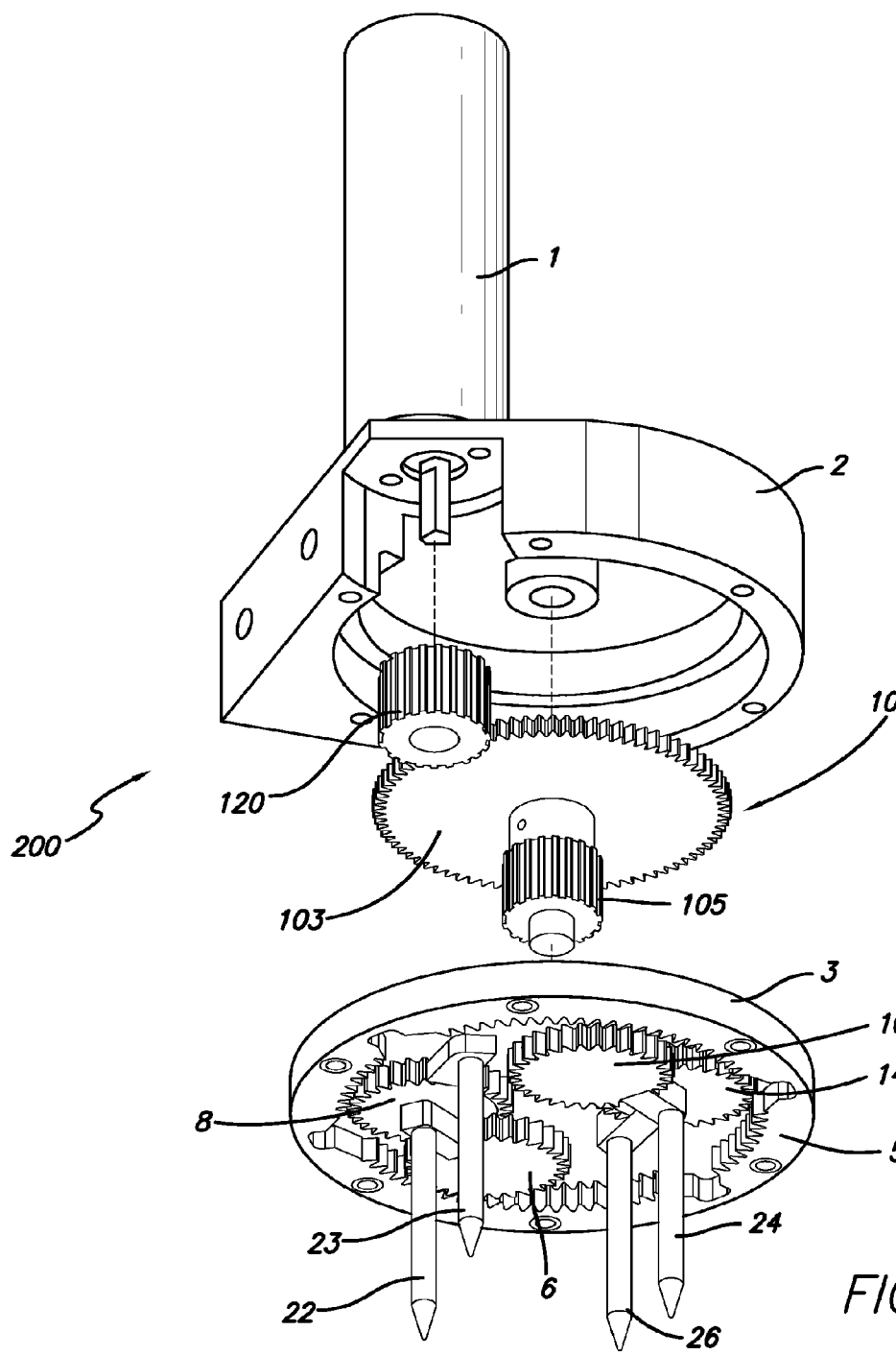
FIG. 7 is an exploded view of the gripper apparatus of FIG. 6.
Figure 8A:
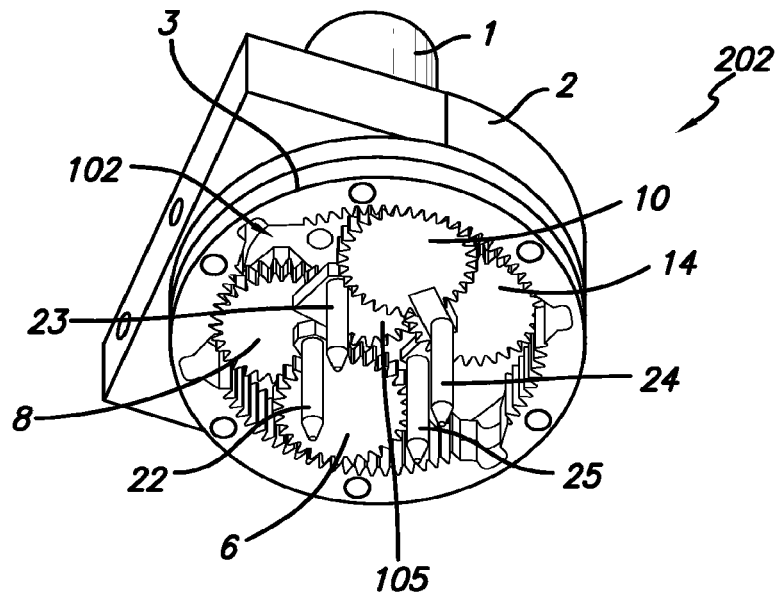
FIG. 8A is a perspective view of a modified gripper apparatus similar to that of FIGS. 6 and 7, with the bottom plate removed.
Figure 8B:
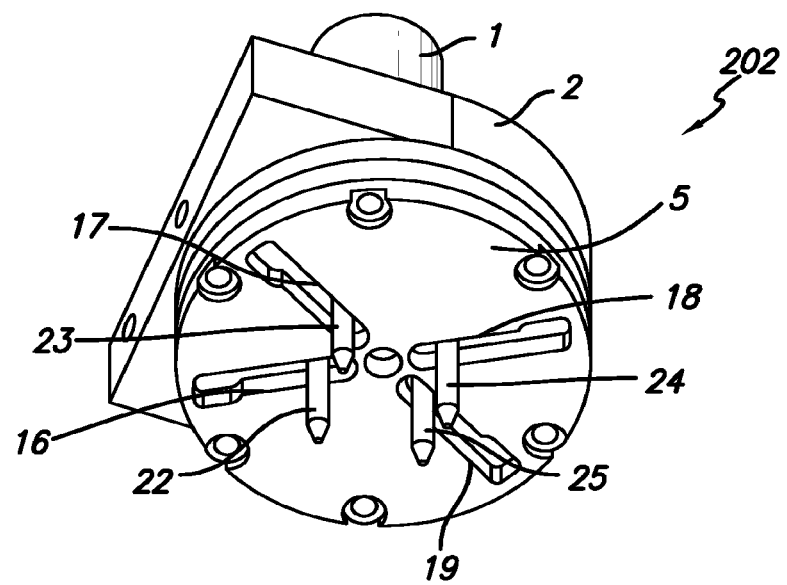
FIG. 8B is a view similar to FIG. 8A with the bottom plate attached.
Figure 8C:
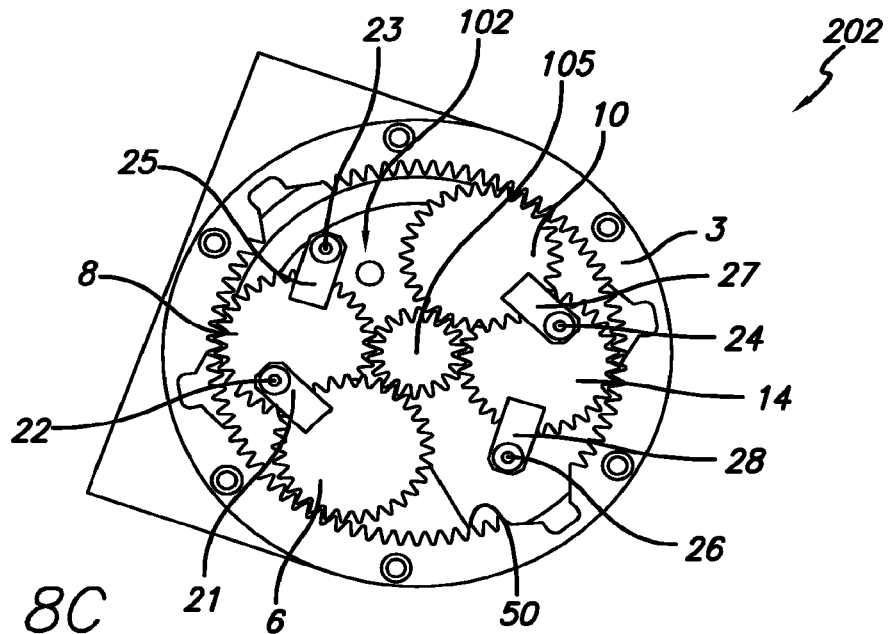
FIG. 8C is a bottom plan view of the gripper apparatus of FIGS. 8A and 8B with the bottom plate removed and the pins moved outwardly from the position of FIG. 8A.
Figure 8D:
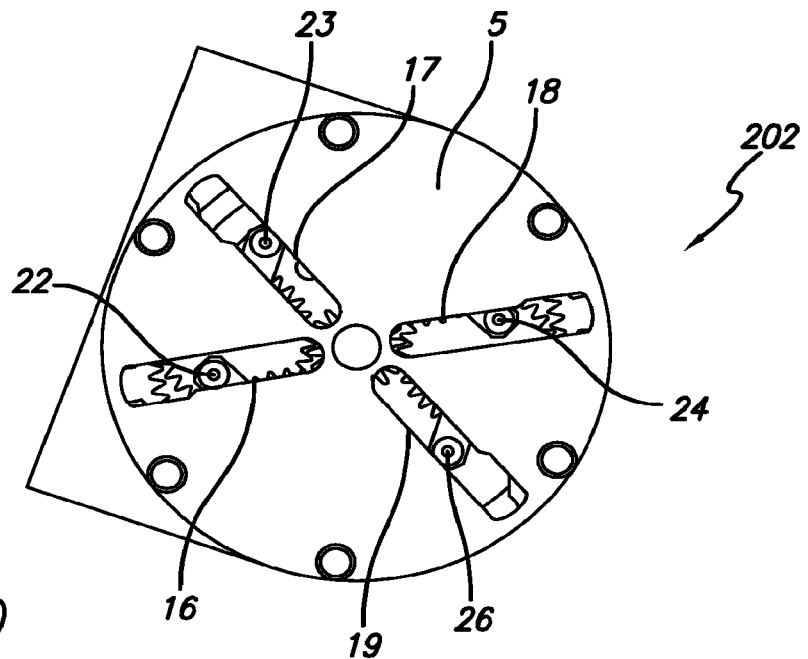
FIG. 8D is a bottom plan view similar to FIG. 8C but with the bottom plate attached.
Figure 9:
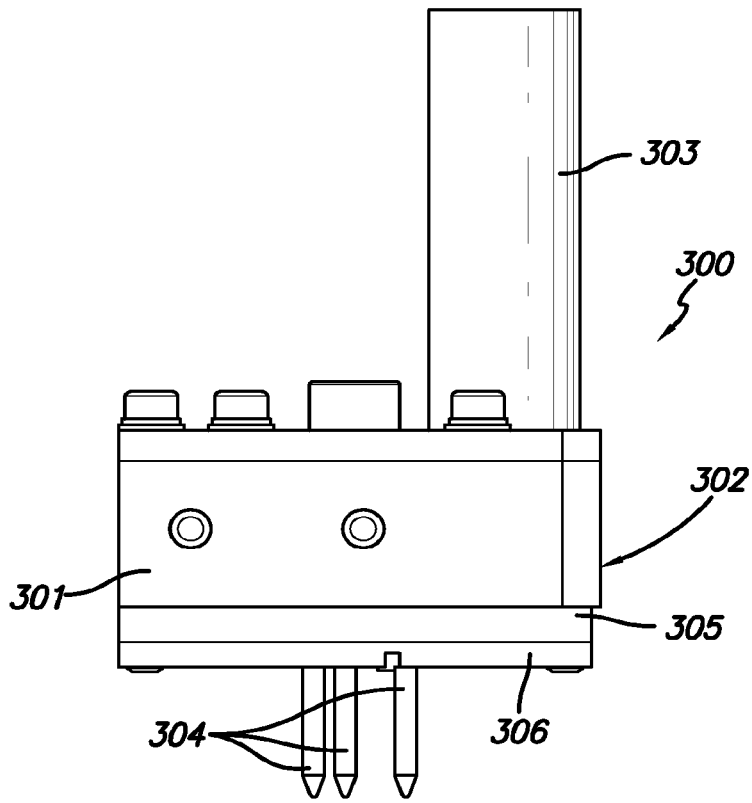
FIG. 9 is a side elevation view of another embodiment of a gripper apparatus having three grippers or gripping pins rather than four.
Figure 10:
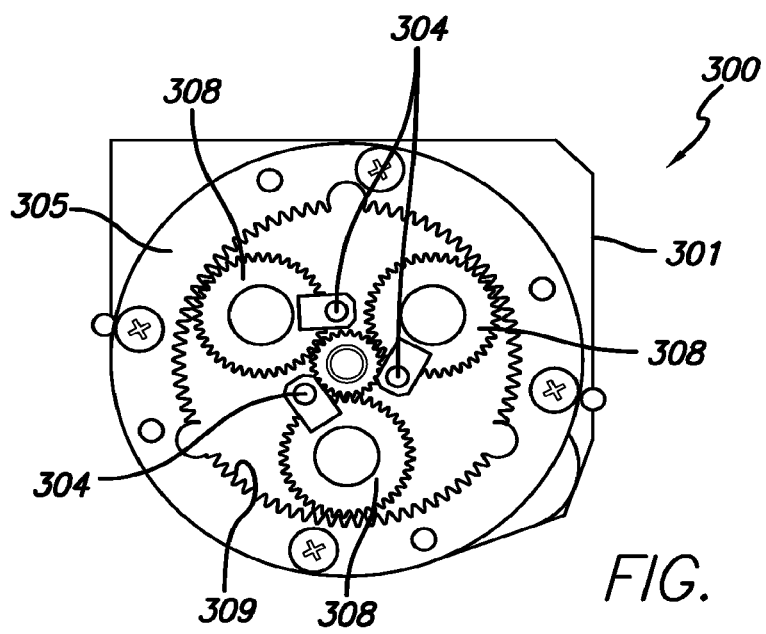
FIG. 10 is a bottom plan view of the apparatus of FIG. 9, with the bottom plate removed.
Figure 11:
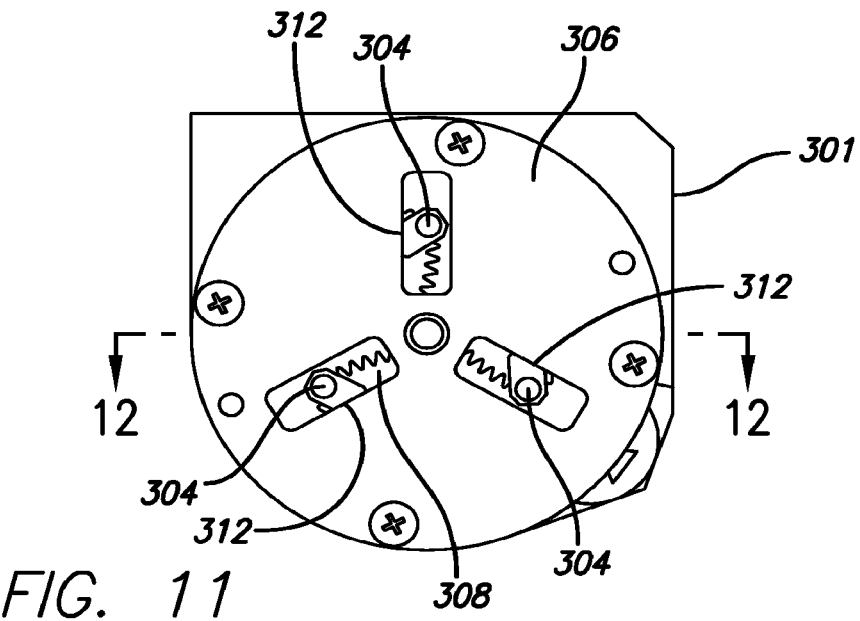
FIG. 11 is a bottom plan view similar to FIG. 10, with the bottom plate attached.
Figure 12:
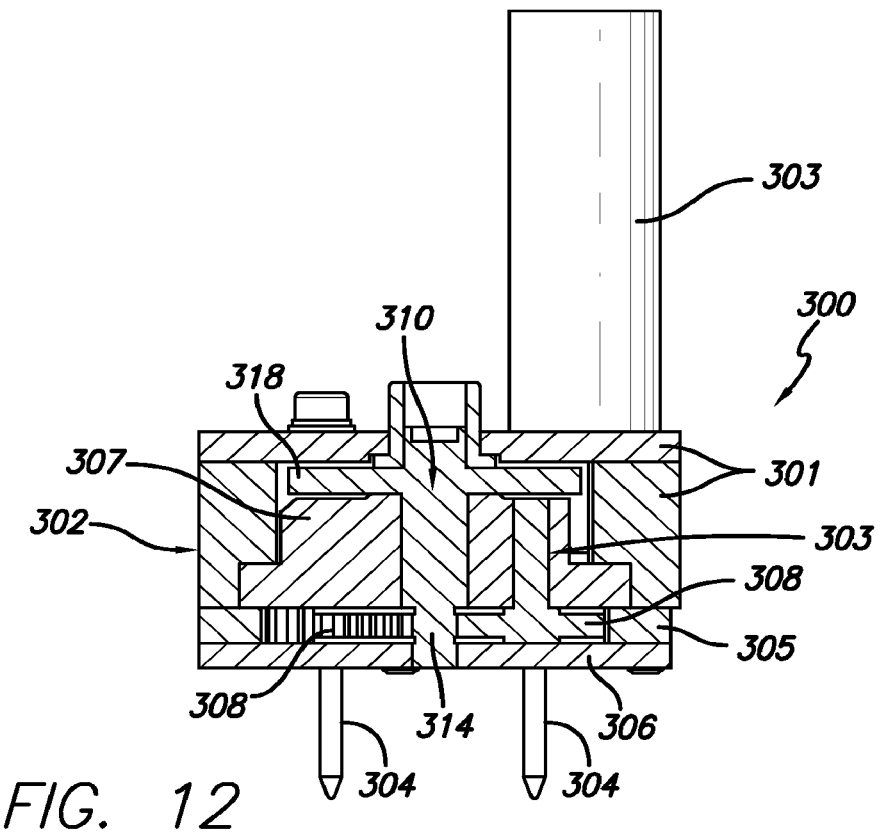
FIG. 12 is a cross sectional view on the lines 12-12 of FIG. 11.
Figure 13:
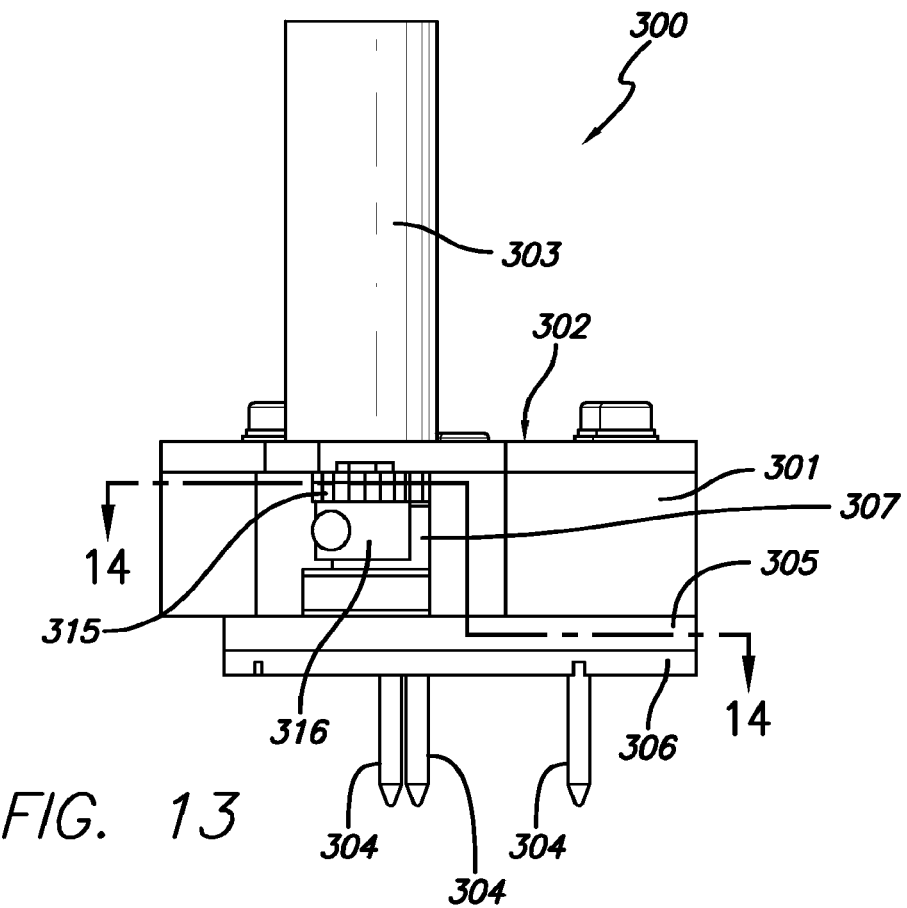
FIG. 13 is a side elevation view of the gripper apparatus similar to FIG. 9 but taken from a different direction and with the pins moved outwardly from the position of FIG. 9.

FIGS. 6 and 7 illustrate a gripper apparatus 200 according to a second embodiment which has a modified planetary gear assembly. Some parts of the apparatus 200 are identical to the previous embodiment, and like reference numbers are used for like parts as appropriate. As in the previous embodiment, the gripper apparatus has a support base 2 mounted on support 1, a stationary ring gear 3 and a stationary bottom plate 5 attached to the bottom of the ring gear to enclose planet gears 6, 8, 10, from which respective gripping pins 22, 23, 24, 26 depend. The planet gears mesh with the teeth 50 of the ring gear 3, while the pins depend from the respective planet gears inside ring gear 3 through respective radial slots 16, 17, 18 and 19 in bottom plate 5 for engagement with the rim of a container or vial, as in the first embodiment. However, in this embodiment, a center gear 102 replaces the crescent gear of the planetary gear assembly in the previous embodiment for driving the planet gears. Center gear 102 has an upper gear 103 which meshes with drive gear 120, and a lower, smaller gear 105 which meshes with the teeth of the respective planet gears 6, 8, 10 and 14, as illustrated in FIGS. 7 and 8C. Rotation of the drive gear 120 rotates center gear 102 to rotate the planet gears about their central axes, while the planet gears also rotate about the central axis of the planetary gear assembly to produce the same radial pin movement as the previous embodiment. Rotation of center gear clockwise and anticlockwise moves the pins to their largest and smallest separation respectively. Operation of the apparatus 200 to pin and pick up containers of various sizes is identical to that described above in connection with FIGS. 1 to 5, apart from the modified gear assembly between the drive motor and planet gears.

The gripper apparatus 202 illustrated in FIGS. 8A to 8D has a slightly different configuration from the apparatus of FIGS. 6 and 7, in which eccentrically mounted drive gear 120 is eliminated and the center gear 102 is driven directly by the servo motor. In this case, the motor (not visible in the drawings but located immediately above center gear 102) is located concentrically with the center gear to drive it directly rather than being located off center, at the corner of the support base, as in the previous embodiment. Other components of apparatus 202 are identical to those of the previous embodiments, and like reference numbers are used for like parts as appropriate. On rotation of the center gear 102 in a clockwise direction, the small lower gear 105 meshes with the teeth of the planet gears in order to drive the planet gears to rotate about their respective central axes in a direction which moves the pins 22, 23, 25 and 26 radially outwardly along the respective slots, towards the outermost position. On rotation in the opposite direction, the pins are moved radially inwards. The pins are illustrated in a more closely spaced position in FIGS. 8A and 8B, and are shown at a location spaced outward from that position in FIGS. 8C and 8D.

FIGS. 9 to 14 illustrate a gripper apparatus 300 according to another embodiment, in which a gripper head 302 has three gripping pins 304 rather than four pins as in the previous embodiment. Three pins may be sufficient in many cases to pin and pick up a vial or container from an array or return a container to the array. As in the previous embodiments, gripper head 302 extends from support 303 and includes a planetary gear assembly 303. Gear assembly 303 comprises three planet gears 308 each having teeth around their outer periphery which engage the internal teeth 309 of ring gear 305, as illustrated fn FIG. 10, rotating carrier 307 (FIG. 12) in which the planet gears are each rotatably mounted, and center gear 310. As in the previous embodiments, gripper head 302 has a support base 301 and a stationary bottom plate 306 attached to the ring gear 305 to enclose the planet gears 308.

Figure 14:
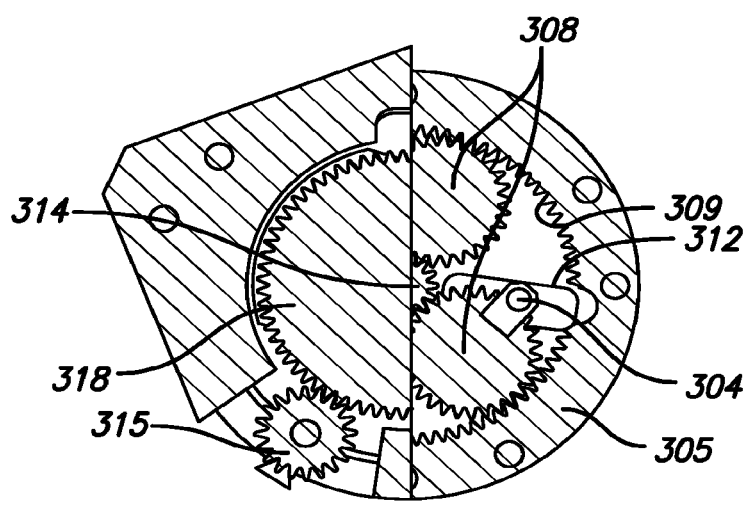
FIG. 14 is a cross sectional view on the lines 14-14 of FIG. 13.

Gripping pins 304 depend from respective planet gears inside ring gear 305 and through respective radial slots 312 in bottom plate 306 for engagement with the rim of a container or vial in a similar manner to the four pins of the previous embodiments. As in the embodiment of FIGS. 6 and 7, the planet gears are driven by a small lower gear 314 of center gear 310, which in turn is driven to rotate by drive gear 315 driven by a small reversible servo motor 316 (FIG. 14) under the control of a suitable controller (not illustrated). Center gear 310 has a larger upper gear 318 which meshes with the teeth of drive gear 315, as illustrated in FIG. 14. Alternatively, the center gear itself may be the drive gear, eliminating the off center drive gear 315, and the servo motor is then centrally located in the support base 301 of the gripper head.

FIG. 15 is a block diagram of one embodiment of a control system for operating the apparatus of FIGS. 9 to 14. A similar control system may be used in each of the embodiments described above. As illustrated in FIG. 15, a gripper controller 350, which may be located in the gripper head 302 or the support arm 303, controls operation of drive motor 7 based on operator input and feedback from drive motor 7. In some embodiments, feedback may be provided by one or more optional optical sensor(s) 352 in the gripper head, which may be used to detect presence or absence of a container between the gripping pins or fingers 304. Drive motor 7 drives gear assembly 354 between the drive motor and planet gears 308. In the embodiment of FIGS. 9 to 14, the gear assembly 354 comprises drive gear 315 and center gear 310, but may comprise only center gear 310 where gear 310 is driven directly by the drive motor, or the crescent gear and gear plate of the first embodiment. As noted above, in order to pick up a container or vial from an array, the gripper head is first moved to a selected position directly above the array, and the gripper controller then controls the drive motor to move the pins inwardly or outwardly until they are at a predetermined spacing from one another defining a predetermined opening of slightly larger dimensions than the container. At this position, the pins are located directly above respective gaps between the selected container and adjacent containers in the array (see FIG. 2A for an example of this position for a four pin gripper). The gripper head is then lowered until the lower ends of the pins extend into the spaces or gaps around the selected container. This position may be controlled by an operator or using input from position sensors.

Once the pins are located in the space around a selected container, the controller controls drive motor 7 to move the pins inwardly until the container is engaged and grasped between the pins which surround it. The motor continues to apply driving force to the pins so that they grasp the container while the gripper head is raised to lift the container from the array and drive it to the desired location, where it may be released by driving the pins outwardly away from the container. The motor gives feedback to the controller 350 as the container is transported, allowing the force applied to the pins to be carefully controlled. In one embodiment, software within the gripper controller will be able to "feel" what is being gripped based on the amount of give as the gripper pins are tightened, allowing the gripper to distinguish between, for example, a metal or hard plastic cap and a rubber stopper, and the controller then uses this information to control the amount of force applied.

The procedure is reversed to return a container to an empty space in an array, with the gripper head driven back to a position above the space in the array and lowered to position the container in the space while the pins grasp the container. The controller than controls motor 7 to drive the pins outwardly away from the container. Once the container is released, the gripper head is raised to move the pins out of the array.

The gripper apparatus in each of the above embodiments provides adjustable gripping pins or fingers which are driven by a planetary gear system to move inwardly and outwardly to pin or release a container.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A gripper apparatus for grasping and lifting containers of varying sizes from an array of containers, the gripper apparatus comprising:
   a gripper head being positionable at a selected position above the array of containers;
   a planetary gear assembly mounted in the gripper head, the planetary gear assembly having a plurality of planet gears;
   a plurality of grip members, each grip member connected to at least one of the plurality of planet gears, each grip member configured to move along a predetermined inward or outward path;
   wherein the planetary gear assembly is configured to rotate the planet gears to move each grip member at least inwardly into engagement with a selected container from the array of containers, whereby the selected container is grasped between the grip members.

2. The apparatus of claim 1, whereby the planetary gear assembly has a central axis of rotation and each of the planet gears has a respective planet gear axis of rotation.

3. The apparatus of claim 2, whereby the planetary gear assembly is configured to move the grip members along radial paths relative to the central axis of rotation.

4. The apparatus of claim 2, wherein the planetary gear assembly further comprises a gear device mounted for rotation about the central axis and each of said planet gears is rotatably associated with said gear device and configured for rotation about the respective planet gear axis and the central axis in opposite directions dependent on the direction of rotation of the gear device.

5. The apparatus of claim 4 further comprising a reversible drive motor attached to the gripper head configured to directly drive the gear device.

6. The apparatus of claim 5, wherein the gear device comprises a gear plate located above the planet gears, each planet gear being rotatably attached to the gear plate, and a drive gear driven by the reversible drive motor and driving the gear plate to rotate.

7. The apparatus of claim 6, wherein the gear plate has a crescent gear which is in driving engagement with the drive gear.

8. The apparatus of claim 5, further comprising a controller associated with the reversible drive motor which is programmed to operate the reversible drive motor to urge the grip members against the selected container positioned between the grip members, whereby the container is grasped between the grip members.

9. The apparatus of claim 4, wherein the gear device has an upper gear and a lower gear spaced below the upper gear and extending into a space between the plurality of planet gears, the lower gear having outer teeth which mesh with the teeth of the plurality of planet gears.

10. The apparatus of claim 9, wherein the upper gear is directly driven by the reversible drive motor.

11. The apparatus of claim 9, further comprising an eccentric drive gear driven by the reversible drive motor, the upper gear having outer teeth which cooperate with the eccentric drive gear, whereby the reversible drive motor causes rotation of the drive gear in opposite directions.

12. The apparatus of claim 1, further comprising a support arm connected to the gripper head, the support arm configured to position the gripper head.

13. The apparatus of claim 1, further comprising a lower end plate secured to the gripper head to enclose the planetary gear assembly, the end plate having a plurality of slots, the number of slots being equal to the number of the grip members, and each of said slots being aligned with a respective grip member and extending along the predetermined path of the respective grip member, whereby each of the grip members projects through a respective slot to grip the selected container.

14. A gripper apparatus for removing and replacing objects in an array of objects, the gripper apparatus comprising:
 a support arm;
 a gripper head mounted to the support arm;
 a plurality of grip members movably extending from the gripper head; and
 a planetary gear assembly mounted in the gripper head and having a plurality of planet gears, where the planetary gear assembly is configured to rotate the planet gears to effect at least inward movement of the grip members and gripping of an object between the grip members.

15. The apparatus of claim 14 further comprising a reversible drive motor attached to the gripper head configured to drive the rotation of the planet gears.

* * * * *